US008280190B2

(12) United States Patent
Nagata et al.

(10) Patent No.: US 8,280,190 B2
(45) Date of Patent: Oct. 2, 2012

(54) IMAGE DISPLAY DEVICE, IMAGE PROCESSING CIRCUIT, AND IMAGE PROCESSING METHOD

(75) Inventors: Koji Nagata, Hachioji (JP); Naruhiko Kasai, Yokohama (JP); Yasuyuki Kudo, Fujisawa (JP); Junichi Maruyama, Yokohama (JP); Masahiro Kageyama, Hino (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1038 days.

(21) Appl. No.: 12/180,909

(22) Filed: Jul. 28, 2008

(65) Prior Publication Data

US 2009/0060365 A1 Mar. 5, 2009

(30) Foreign Application Priority Data

Aug. 28, 2007 (JP) ................................ 2007-220494

(51) Int. Cl.
*G06K 9/32* (2006.01)
*H04N 5/228* (2006.01)
*G09G 5/00* (2006.01)
*G06K 15/02* (2006.01)

(52) U.S. Cl. .................. 382/298; 348/208.13; 645/671; 358/1.2

(58) Field of Classification Search .................. 382/254, 382/255, 263, 274, 298, 299, 305, 312; 358/1.1, 358/528, 1.2, 532; 345/204, 660, 671, 691, 345/698; 348/208.4, 208.13, 252, 739
See application file for complete search history.

(56) References Cited

U.S. PATENT DOCUMENTS

| | | | | |
|---|---|---|---|---|
| 7,002,540 | B2 * | 2/2006 | Aoki | 345/89 |
| 7,106,350 | B2 * | 9/2006 | Baba et al. | 345/691 |
| 7,133,157 | B2 * | 11/2006 | Ito | 358/1.9 |
| 7,356,254 | B2 * | 4/2008 | Aoyama | 396/147 |
| 7,379,624 | B2 | 5/2008 | Hoshi | |
| 7,489,350 | B2 * | 2/2009 | De Haan et al. | 348/252 |
| 7,599,568 | B2 * | 10/2009 | Aoyama | 382/255 |
| 7,844,128 | B2 | 11/2010 | Toyooka et al. | |

FOREIGN PATENT DOCUMENTS

| | | |
|---|---|---|
| JP | 2000137469 | 5/2000 |
| JP | 2002333859 | 11/2002 |
| JP | 2005151306 | 6/2005 |
| JP | 2006184896 | 7/2006 |

OTHER PUBLICATIONS

H. F. Chen, et al, EuroDisplay 2005, pp. 359-361.
Japanese Office Action, mailed Mar. 6, 2012, issued in corresponding Japanese Patent Application No. 2007-220494 with partial English language translation.

* cited by examiner

*Primary Examiner* — Kanjibhai Patel
(74) *Attorney, Agent, or Firm* — Brundidge & Stanger, P.C.

(57) ABSTRACT

To provide a processing method for reducing motion blur while increasing resolution. By performing a super-resolution process, a resolution-increased image is obtained from an input image in multiple frames. By performing an enlargement process, an enlarged image is obtained from the input image in one frame. A high-frequency image is obtained by subtracting the enlarged image from the resolution-increased image. A high spatial frequency-emphasized image is obtained by adding the high-frequency image to the resolution-increased image. The enlarged image and high spatial frequency-emphasized image are displayed alternately every half frame.

7 Claims, 9 Drawing Sheets

Prior Art

Prior Art

IMAGE DISPLAY DEVICE, IMAGE PROCESSING CIRCUIT, AND IMAGE PROCESSING METHOD

CLAIM OF PRIORITY

The present application claims priority from Japanese patent application serial No. JP 2007-220494, filed on Aug. 28, 2007, the content of which is hereby incorporated by reference into this application.

BACKGROUND OF THE INVENTION

The present invention relates to an image display device for displaying an image while increasing the resolution of the image, and an image processing circuit of such an image display device. In particular, the invention relates to an image display device such as a cathode ray tube display device, a liquid crystal display device, a plasma display device, an organic electroluminescent (EL) display device, or an electric discharge display device, and an image processing circuit of such an image display device.

Proposed as a pseudo-impulse display method for obtaining an effect of reducing motion blur caused by the hold-type display method used by liquid crystal display devices and the like, in particular, as a method for avoiding a reduction in luminance or the limitation on the number of gray levels due to black frame insertion and obtaining an effect of reducing motion blur is a method for displaying only high spatial frequency components related to the occurrence of motion blur among spatial frequency components of an image in the form of impulses and displaying low spatial frequency components thereamong using the hold-type display method (Smooth Frame Insertion Method for Motion-Blur Reduction in LCDs, Euro Display 2005 (Samsung Electronics)). Specifically, in this method, the image display cycle is doubled to alternately display an image in which high spatial frequency components are eliminated and the image in which high spatial frequency components are emphasized (doubled). As a result, motion blur is reduced and the luminance reduction problem or gray level number limitation problem is resolved. Also, the configuration of the image processing device is simplified.

SUMMARY OF THE INVENTION

However, the above-described method, which has an effect of reducing motion blur, has no effect of increasing the resolution. That is, there is no description of a processing method for reducing motion blur while increasing the resolution in "Smooth Frame Insertion Method for Motion-Blur Reduction in LCDs."

An advantage of the present invention is to provide a device, a circuit and a method that each reduce motion blur while increasing the resolution.

For that purpose, in an image display method according to the present invention, a resolution-increased image obtained by creating components in a spatial frequency range wider than the original spatial frequency range of a displayed image by performing a resolution increasing process and an image that does not include the high spatial frequency components are alternately displayed.

Specifically, there are provided a resolution increasing circuit for performing a resolution increasing process on an input displayed pixel, an enlargement circuit for performing a process for matching the input displayed image with an output pixel configuration, and a frame control circuit for alternately outputting an output from the resolution increasing circuit and an output from the enlargement circuit according to an input synchronizing signal. As a key feature, a super-resolution process is performed in the resolution increasing process.

The super-resolution process here refers to a process for matching displayed image portions common to images in consecutive multiple frames with one another using motion compensation and, from an image including multiple sampling points obtained in this way, newly creating a resolution-increased image with a high spatial resolution.

According to the present invention, by performing a resolution increasing process, components in a spatial frequency range wider than the original spatial frequency range of a displayed image is displayed in the form of impulses. This reduces motion blur while increasing the resolution.

BRIEF DESCRIPTION OF THE DRAWINGS

These and other features, objects, and advantages of the present invention will become more apparent from the following description when taken in conjunction with the accompanying drawings wherein.

DESCRIPTION OF THE EMBODIMENTS

Figure 1A:
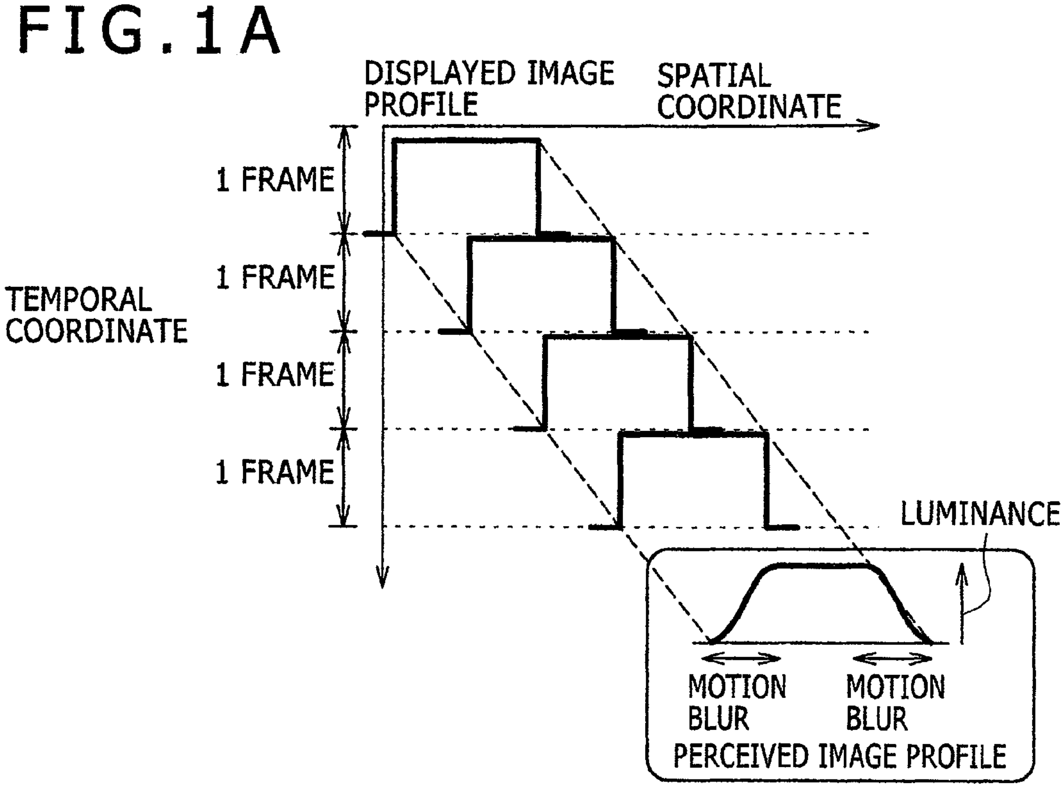
FIGS. 1A and 1B are graphs showing a motion blur occurrence mechanism and a motion blur reduction mechanism, respectively.
Figure 1B:
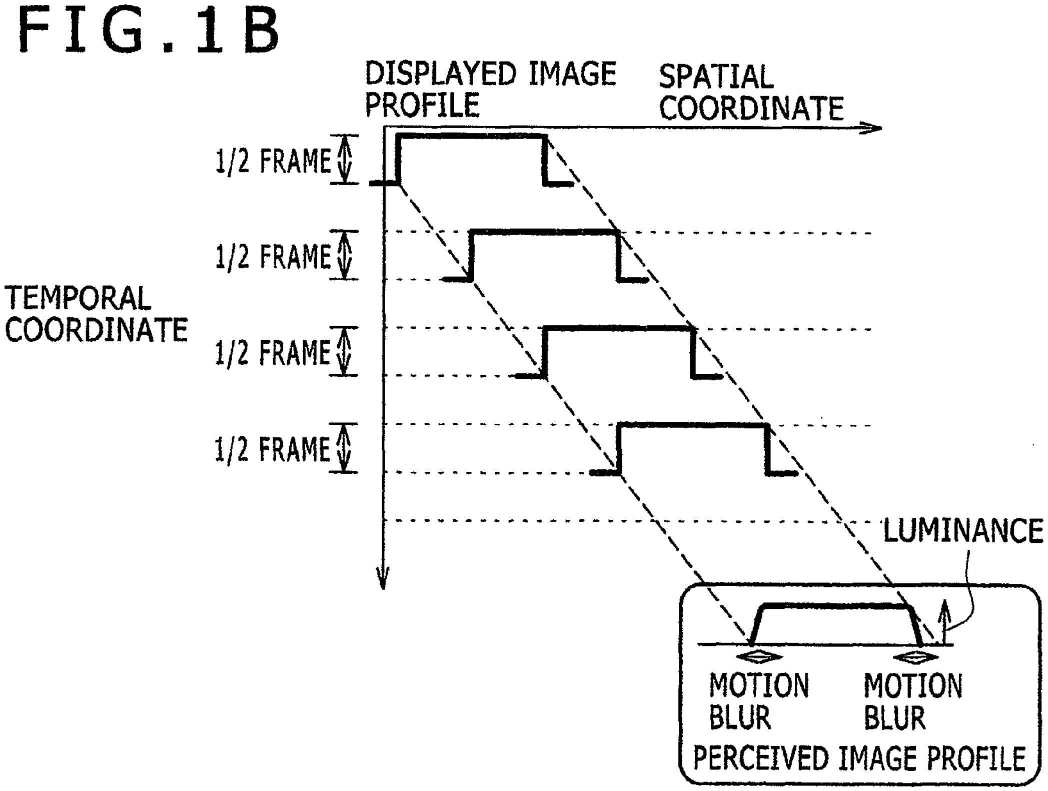

FIGS. 1A and 1B are graphs showing a motion blur Occurrence mechanism and a motion blur reduction mechanism. FIG. 1A is a graph showing a mechanism of occurrence of motion blur due to the hold-type display method used in liquid crystal display devices and the like. Since the image is a moving image, a displayed image profile moves along the spatial coordinate with the lapse of time (each time one frame elapses). In this case, a perceived image profile for an observer is obtained by adding the amount of integration of displayed image profiles in the past several frames to a displayed image profile currently being displayed. For this reason, if the image is continuously displayed during one frame as is done in the hold-type display method, the widths of the changing parts of the perceived image profile at both edges thereof are increased. That is, an effect of integration of the past displayed image profiles is strongly demonstrated. As a result, significant motion blur occurs. On the other hand, FIG. 1B shows a case where the image is displayed using the pseudo-impulse display method. The pseudo-impulse display method is a method for displaying images in a pseudo-impulse manner by resetting the display (by inserting black images or turning off the backlight for flashing) so that the hold-type display used in liquid crystal devices and the like becomes similar in appearance to the impulse-type display used in cathode ray tube display devices and the like. In FIG. 1B, the image is displayed only during half a frame and a black image is displayed during the other half frame. By using this method, the widths of the changing parts of the perceived image profile at both ends thereof are reduced. As a result, the effect of integration of the past displayed image profiles is reduced so that motion blur is reduced. However, the overall luminance is reduced.

Figure 2:
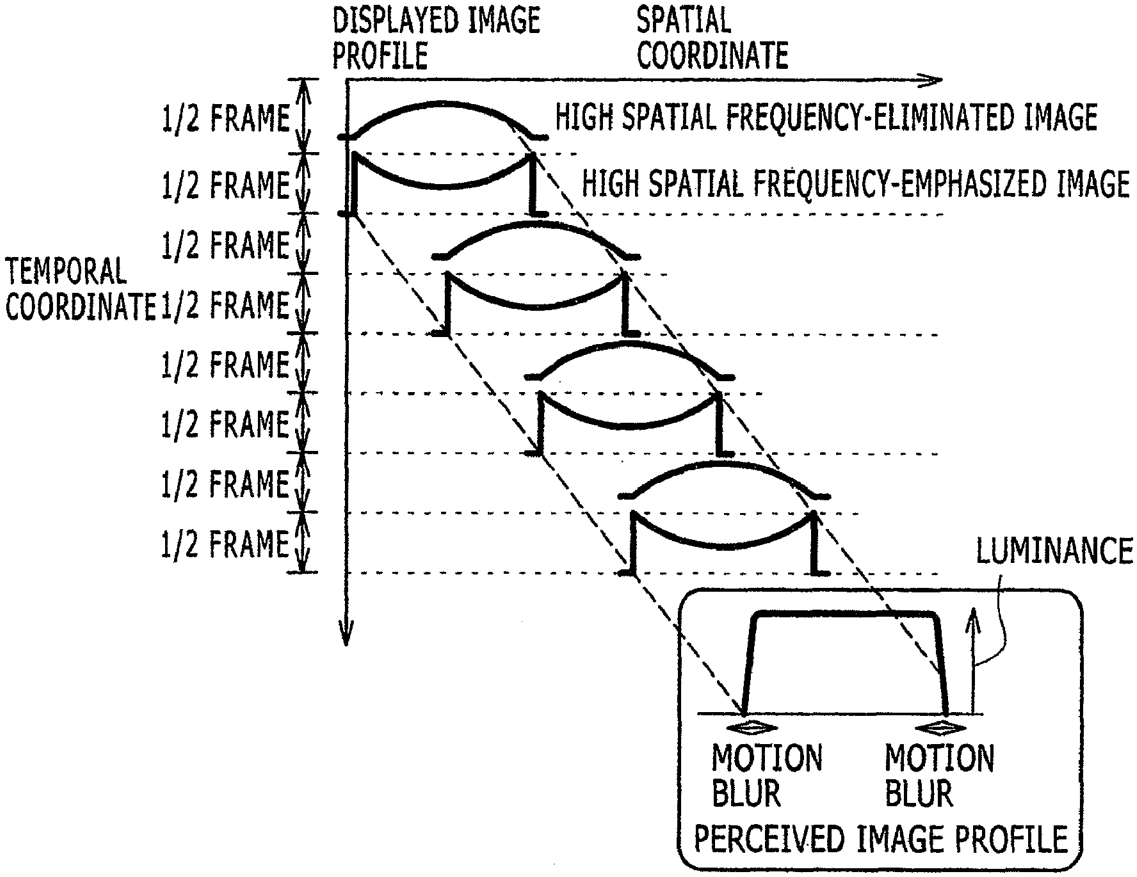
FIG. 2 is a diagram showing a mechanism for reducing a reduction in luminance by using the pseudo-impulse display method.

FIG. 2 is a graph showing a mechanism for reducing a reduction in luminance caused by the pseudo-impulse display method shown in FIG. 1B. Here, noting that a factor of occurrence of motion blur is high spatial frequency components of a displayed image, the high spatial frequency components are displayed using the pseudo-impulse display method only during half a frame as shown in FIG. 1B and low spatial frequency components that do not cause motion blur are displayed using the hold-type display method as shown in FIG. 1A. Also, in order to prevent a reduction in luminance due to a reduction in motion blur, the high spatial frequency components to be displayed in the pseudo-impulse display method only during half a frame are displayed with twice the original intensity. By using this method, the effect of integration of the high spatial frequency components of the past displayed image profiles that are responsible for motion blur is reduced. As a result, motion blur is reduced. Further, light is emitted in a period equal to a period when hold-type display is performed. As a result, a reduction in luminance is reduced.

Figure 3:
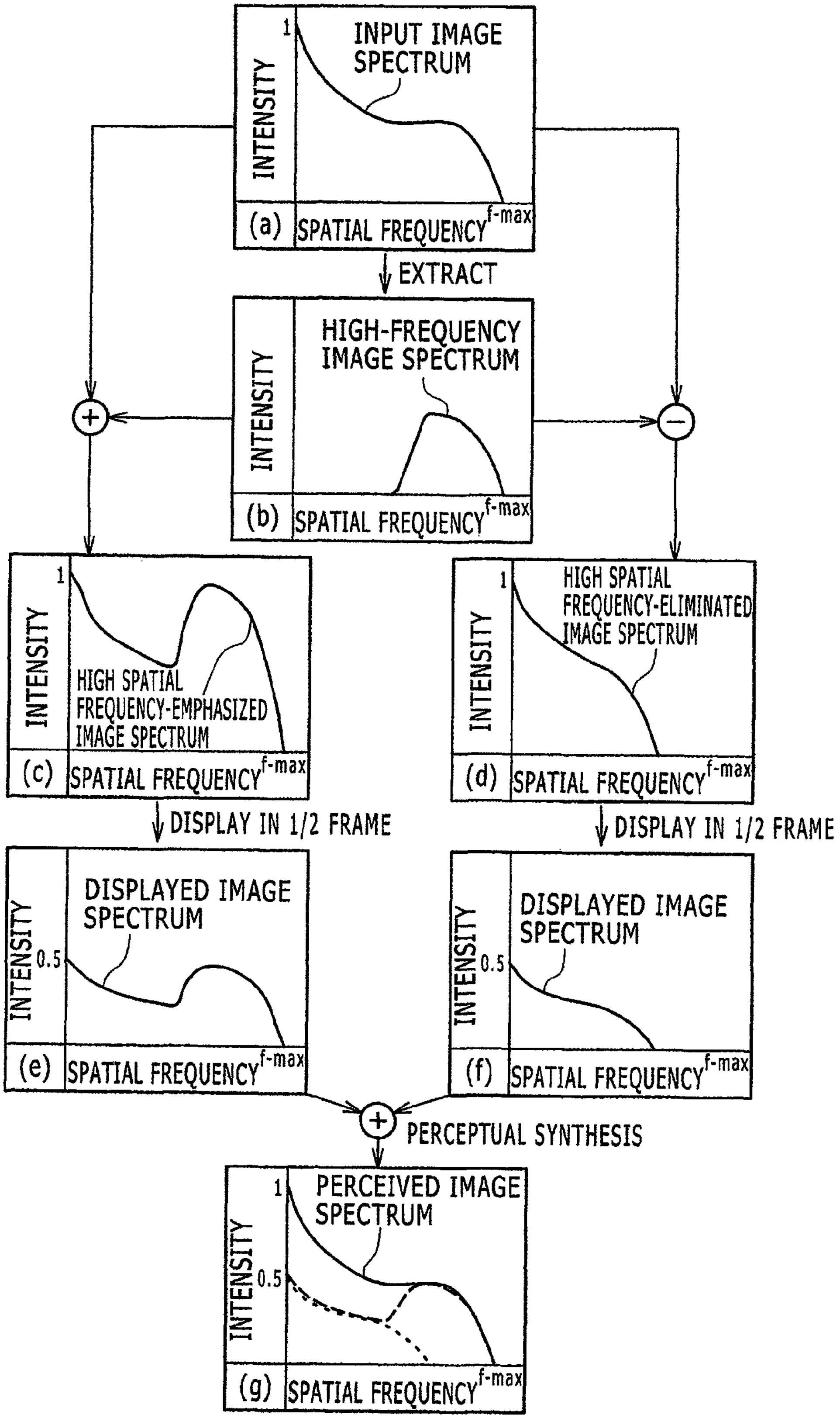
FIGS. 3A to 3G are graphs each showing a change in an image spectrum made when a process is performed so as to reduce a luminance reduction.

FIGS. 3A to 3G are graphs each showing a change made in spectrum of an image when a process is performed according to the method shown in FIG. 2. FIG. 3A shows the spatial frequency spectrum of an input image. "f-max" represents the maximum value of the spatial frequency of the input image. By extracting high-frequency components from the input image A using a high-pass filter, a high-frequency image B is obtained. FIG. 3B shows a spectrum of the high-frequency image. Next, by adding the high-frequency image B to the input image A, a high spatial frequency-emphasized image C is obtained. Also, by subtracting the high-frequency image B from the input image A, a high spatial frequency-eliminated image D is obtained. FIG. 3C shows a spectrum of the high spatial frequency-emphasized image and FIG. 3D shows a spectrum of the high spatial frequency-eliminated image. By displaying these images alternately every half frame using the pseudo-impulse display method, displayed images E and F are perceived as a perceived image G by the observer in a synthesized manner. FIGS. 3E, 3F, and 3G show the corresponding spectrums. By performing the above-described steps, the spectrum intensity of the input image is maintained; therefore, no luminance reduction occurs. However, in this method, the spatial frequency range of the perceived image is the same as that of the input image; therefore, an effect of increasing the resolution is not obtained.

In view of the foregoing, in embodiments of the present invention, an enlargement process for creating interpolation pixel data from pixel data in an identical frame so that the spatial frequency is not changed and a super-resolution process that serves as a resolution increasing process and creates interpolation pixel data from changes in pixel data in multiple frames so that the spatial frequency is increased are used. Then, a super-resolution process-subjected image and an enlargement process-subjected image are alternately displayed in such a manner that high-frequency components of the super-resolution process-subjected image are emphasized and high-frequency components of the enlargement process-subjected image are left intact without being eliminated. Thus, even if the resolution is increased, a perceived image with less motion blur and less luminance reduction is obtained. Also, in this embodiment, a process for increasing the resolution, and a process for emphasizing high spatial frequency components and a process for eliminating high spatial frequency components are not performed separately. That is, in this embodiment, after a process for increasing the resolution is performed, a process for emphasizing high spatial frequency components or a process for eliminating high spatial frequency components is not performed. Or after a process for emphasizing high spatial frequency components and a process for eliminating high spatial frequency components, a process for increasing the resolution is not performed. Instead, a process for emphasizing high spatial frequency components is combined with a process for increasing the resolution so that there is no need to perform a process for eliminating high spatial frequency components. As a result, the number of processes is reduced. Hereafter, an embodiment in which the number of pixels of the original image is doubled in the vertical direction and doubled in the horizontal direction will be described. Note that the number of pixels need not always be doubled in the vertical and horizontal directions.

First Embodiment

Figure 4:
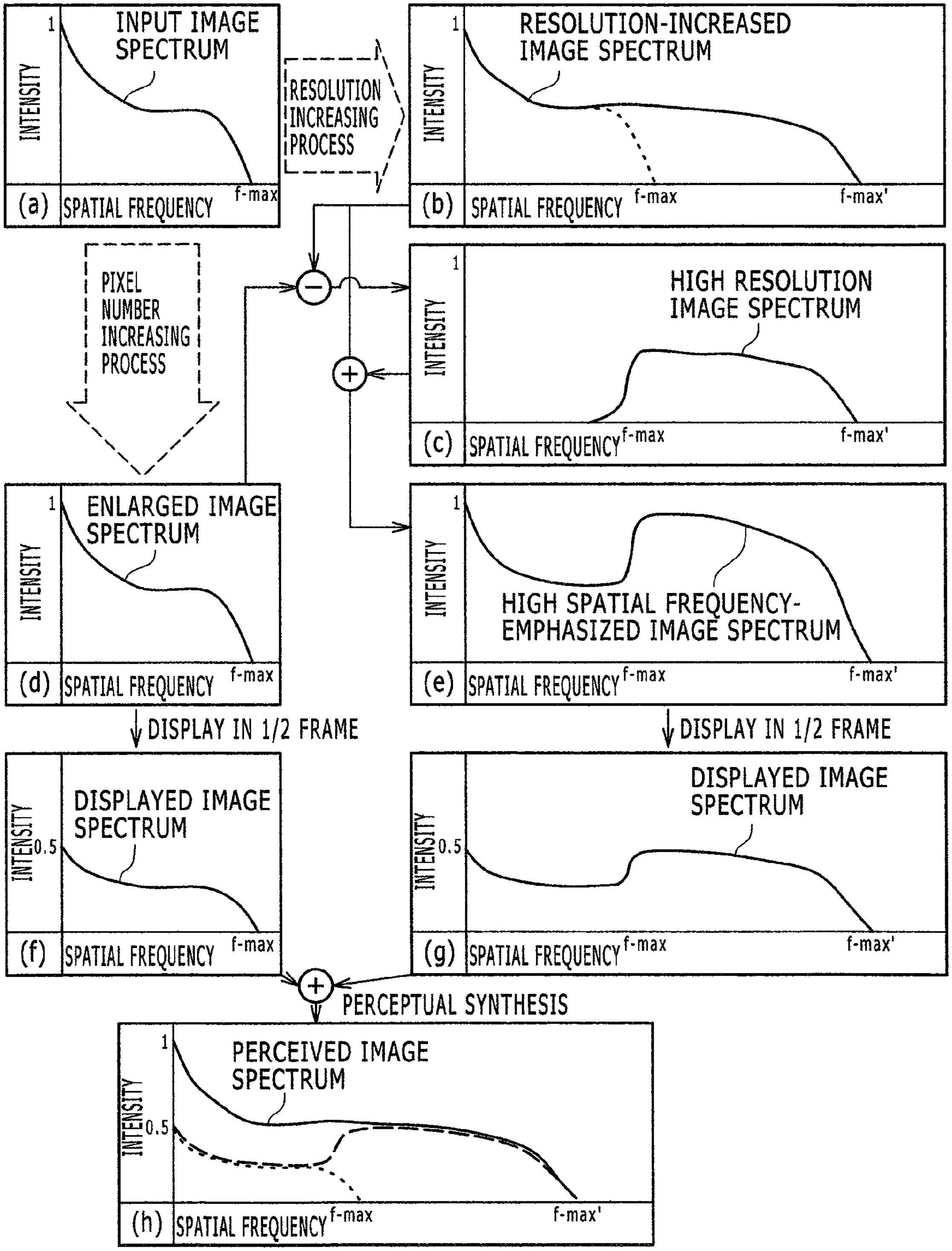
FIGS. 4A to 4H are graphs showing the concept of a resolution increasing process.

FIGS. 4A and 4G are graphs showing the concept of a process for increasing the resolution according to a first embodiment of the present invention. Like FIGS. 3A to 3G, FIGS. 4A and 4G show images as graphs whose vertical axis represents the intensity of an image spectrum and whose horizontal axis represents the spatial frequency of an image.

FIG. 4A shows an image input to a high-resolution display control circuit. "f-max" represents the maximum value of the spatial frequency of the input image. The intensity of a spectrum of the input image at the time when the spatial frequency is the minimum value is set to "1." A characteristic of the input image spectrum according to this embodiment is a horizontal S-shaped curve.

FIG. 4B shows a resolution-increased image obtained by subjecting the input image A to a super-resolution process. Since the resolution of the input image is doubled due to the super-resolution process, the maximum value of the spatial frequency is also increased up to f-max', which is double the original value. In particular, the spectrum characteristic is slid from f-max to f-max'.

FIG. 4D shows an enlarged image obtained by subjecting the input image A to an enlargement process for associating the input image A with a resolution-increased pixel number configuration. The enlargement process here refers to a process for creating new pixel data from an adjacent pixel and interpolating a new pixel in the original pixel so as to increase the resolution. That is, in a super-resolution process, a high-resolution image is created from the original image in continuous multiple frames; in an enlargement process, a high-resolution image is created from the original image in an identical frame (a single frame). Therefore, a spectrum of the enlarged image D has the same range as that of a spectrum of the input image A. That is, the maximum value of the spatial frequency of the enlarged image spectrum is equal to the maximum value f-max of the spatial frequency of the input image spectrum. However, depending on the algorithm of the enlargement process, the spatial frequency range of the spectrum of the enlarged image D may become wider than the spatial frequency range of the spectrum of the input image A. Also, and the maximum value of the spatial frequency of the enlarged image spectrum may becomes larger than the maximum value f-max of the spatial frequency of the input image spectrum.

FIG. 4C is a high-frequency image obtained by extracting high-frequency components from the resolution-increased image B. For example, high-frequency components are components in half or more (a range of f-max'/2 or more) of the entire spatial frequency range or components in a range (a range of f-max or more) equal to or wider than the entire spatial frequency range of the input image in the entire spatial frequency range. In this case, the enlarge image D may be subtracted from the resolution-increased image B or a high-frequency pass filter may be caused to act on the resolution-increased B.

FIG. 4E is a high spatial frequency-emphasized image obtained by synthesizing (adding) the resolution-increased image B and high-frequency image components C. Therefore, the spectrum intensity of high-frequency components of the high spatial frequency-emphasized image is high and emphasized. The high-frequency components of the high spatial frequency-emphasized image are doubled.

FIG. 4F is a displayed image obtained by displaying the enlarged image D in a half frame. FIG. 4G is a displayed image perceived by an observer when the high spatial frequency-emphasized image E is displayed in a half frame. By displaying the images D and E in a half frame, the respective spectrum intensities are reduced to half those in a case where these images are displayed in one frame.

By displaying the enlarged image D and high spatial frequency-emphasized image E alternately every half frame using the pseudo-impulse display method, the displayed images F and G are perceived as a perceived image H by the observer. The perceived image H has the same spatial frequency spectrum as that of the resolution-increased image B. Therefore, the perceived image H is perceived as an image with increased resolution and no luminance reduction by the observer. Without being limited to every half frame, the enlarged image D and high spatial frequency-emphasized image E may be displayed alternately every frame, every one-third frame, or one-fourth frame. Or, without being limited to every half frame, the proportion of the display period of the high spatial frequency-emphasized image E in a frame may be increased. Conversely, the proportion of the display period of the enlarged image D may be increased.

FIGS. 5A to 5D are graphs showing a mechanism for reducing motion blur according to this embodiment. In this example, the enlarged image D shown in FIG. 4D and high spatial frequency-emphasized image E shown in FIG. 4E serving as a resolution-increased image are displayed as pseudo-impulses alternately every half frame.

Figure 5A:
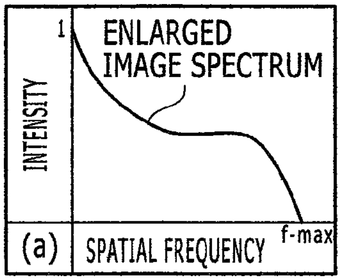
FIGS. 5A to 5D are graphs showing a mechanism for reducing motion blur.
Figure 5B:
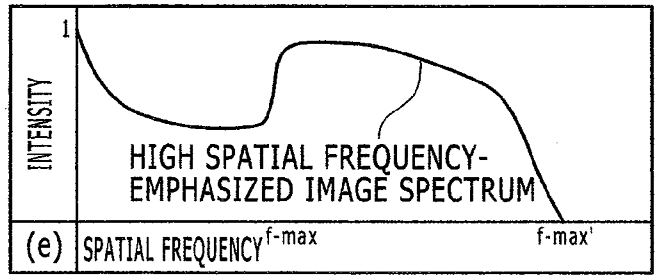
Figure 5C:
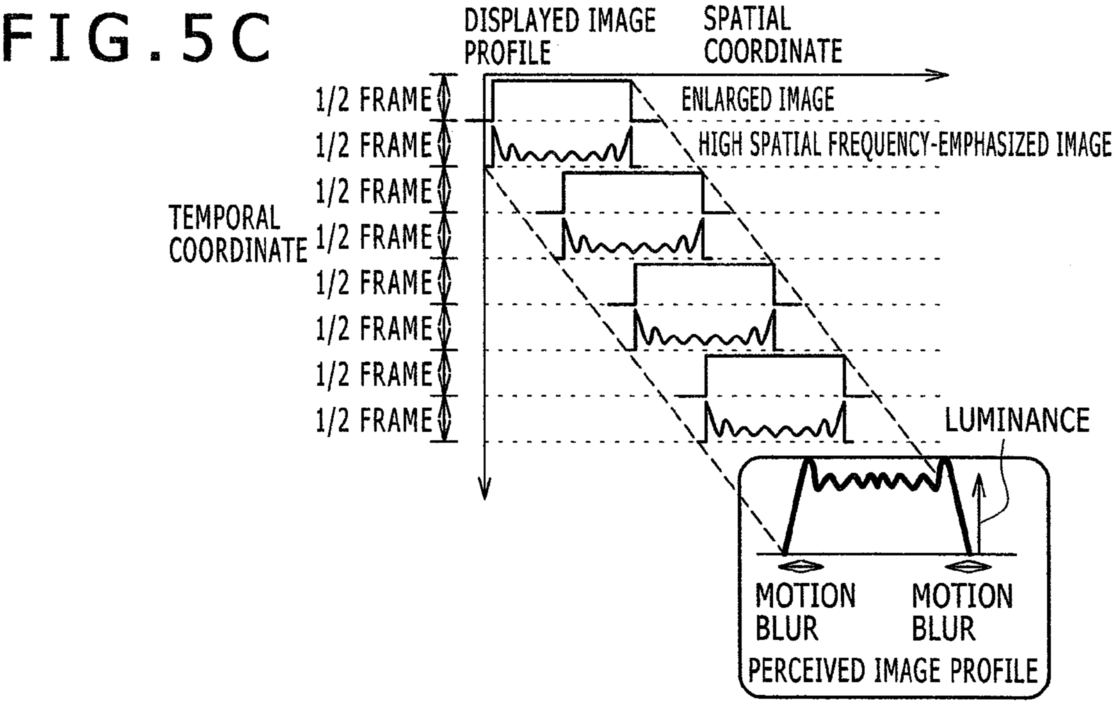
Figure 5D:
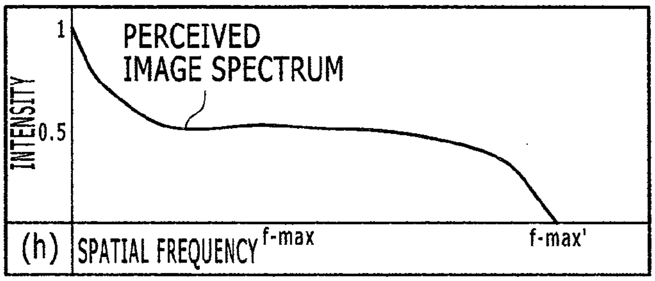

FIG. 5A shows a spectrum characteristic of an enlarged image. FIG. 5B shows a spectrum characteristic of a high spatial frequency-emphasized image. FIG. 5C shows displayed image profiles of the enlarged image and high spatial frequency-emphasized image, as well as shows how the respective displayed image profiles change spatially with the lapse of time if these images are displayed alternately every half frame. FIG. 5D shows a spectrum characteristic of a perceived image.

From FIG. 5C, it is understood that the displayed image profile of the high spatial frequency component-emphasized image shows minute change structures not found in the displayed image profile of the input image due to having undergone a resolution increasing process. By using this method, the widths of the changing portions of the perceived image profile at both ends thereof are reduced. Thus, the effect of integration of high spatial frequency components of the past displayed image profiles that are responsible for motion blur is reduced. As a result, motion blur is reduced. Further, light is emitted in a period equal to a period when hold-type display is performed. As a result, no luminance reduction occurs.

Figure 6:
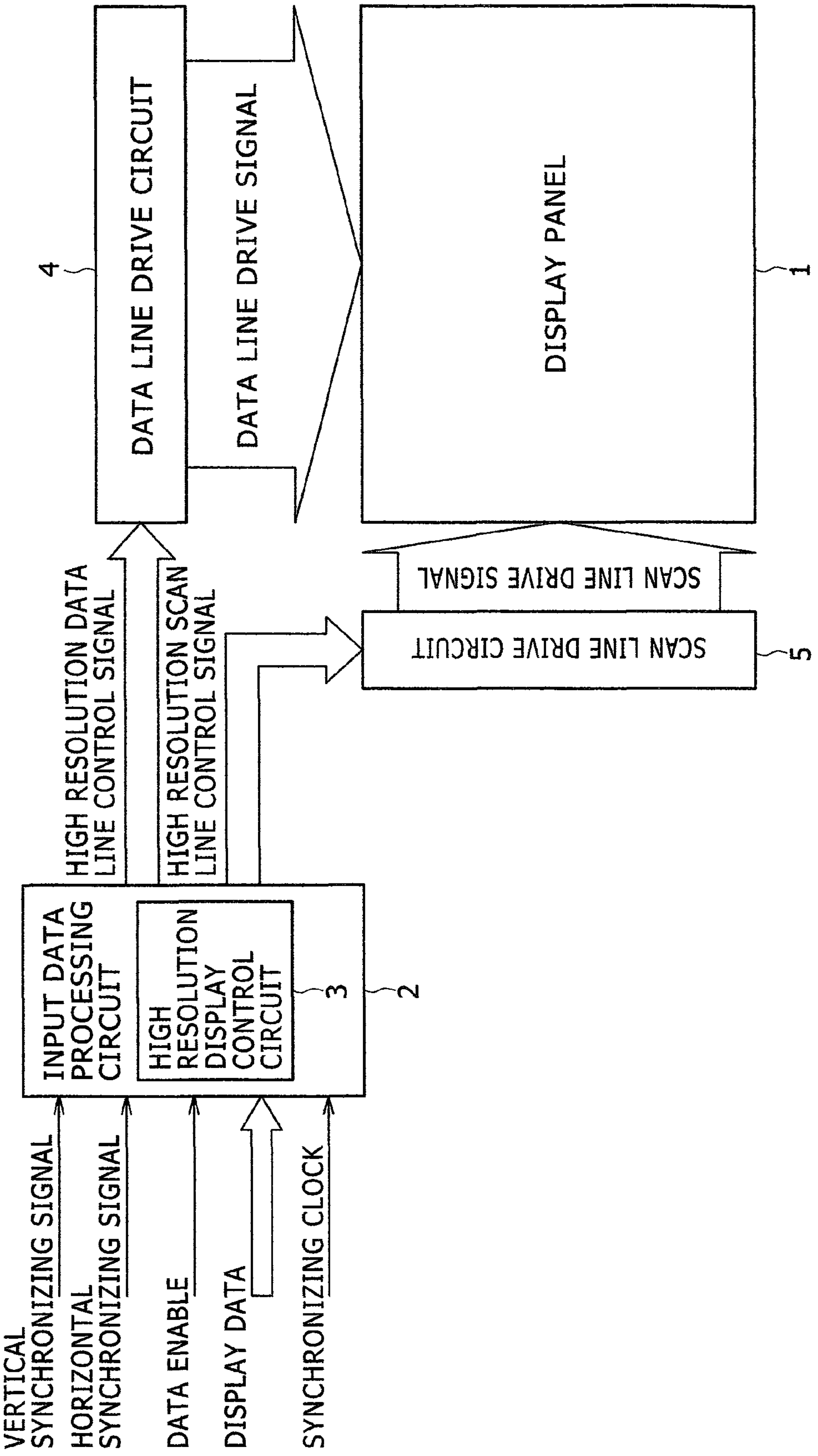
FIG. 6 is a diagram showing a configuration of an overall system.

FIG. 6 shows an overall system configuration of this embodiment. In FIG. 6, the system includes a display panel 1 having multiple pixels arranged in a matrix thereon, an input data processing circuit 2 having an interface function of receiving display data or various types of signals from the outside, a high-resolution display control circuit 3 for increasing the resolution of display data and creating a timing signal corresponding to the increased resolution, a data line drive circuit 4 for applying a data line drive signal (e.g., gray-scale voltage) corresponding to display data to each pixel via a data line, and a scan line drive circuit 5 for applying a scan line drive signal (e.g., selection voltage) to a pixel to which a data line drive signal should be applied, via a scan line. The display panel 1, data line drive circuit 4, and scan line drive circuit 5 constitute a display module. The system is characterized in that the input data processing circuit 2 has a moving image resolution increasing function (high-resolution display control circuit 3) according to this embodiment. The resolution (e.g., 640 horizontal×480 vertical pixels) of the input display data is different from the resolution (e.g., 1920 horizontal×1080 vertical pixels) of the display panel. That is, the resolution of the display panel is higher than that of the input display data; therefore, the resolution of the input display data is increased in the high-resolution display control circuit 3. Concurrently, the amount of data to the data line drive circuit 4 is increased and the frequency of the control signal is increased.

In the display panel 1, data lines are disposed in the column direction and scan lines are disposed in the row direction. A pixel is disposed at the intersection of a data line and a scan line in such a manner that the data line and scan line are coupled to the pixel. The display element of a pixel is a liquid crystal element, a plasma element, an organic EL element, an electric discharge element, or the like. The high-resolution display control circuit 3 receives a vertical synchronizing signal for determining the period (timing) of one screen, a horizontal synchronizing signal for determining the period (timing) of one line, data enable indicating that display data is to be input, display data, and a synchronizing clock for determining the period (timing) of a pixel, from other apparatuses (e.g., a television tuner, a display memory, a hard disk, a personal computer main body). The size of the display data may be either of 8 bits and 10 bits. Then, the high-resolution display control circuit 3 creates a high-resolution data line control signal and a high-resolution scan line control signal corresponding to the resolution of the display panel 1 from the received display data and synchronizing signal. The data line drive circuit 4 receives the high-resolution data line control signal to create a data line drive signal corresponding to display data included in the high-resolution data line control signal. The scan line drive circuit 5 receives the high-resolution scan line control signal to apply a scan line drive signal to one or more scan lines sequentially from top to bottom according to the received high-resolution scan line control signal. Then, the data line drive signal is applied to a pixel to which the scan line drive signal has been applied. The pixel indicates the luminance according to the magnitude of the data line drive signal. If the display element of the pixel is a liquid crystal element, the pixel indicates the luminance according to a potential difference between the data line drive signal and a counter voltage. Therefore, the same luminance is indicated whether the data line drive signal is larger than the counter voltage (positive polarity) or the data line drive signal is smaller than the counter voltage (negative polarity). Also, the positive polarity and negative polarity may be switched every frame. For example, the high spatial frequency-emphasized image and enlarged image may be both displayed with positive polarity in a frame (N-th frame) and these images may be both displayed with negative polarity in the next frame ((N+1)-th frame).

Figure 7:
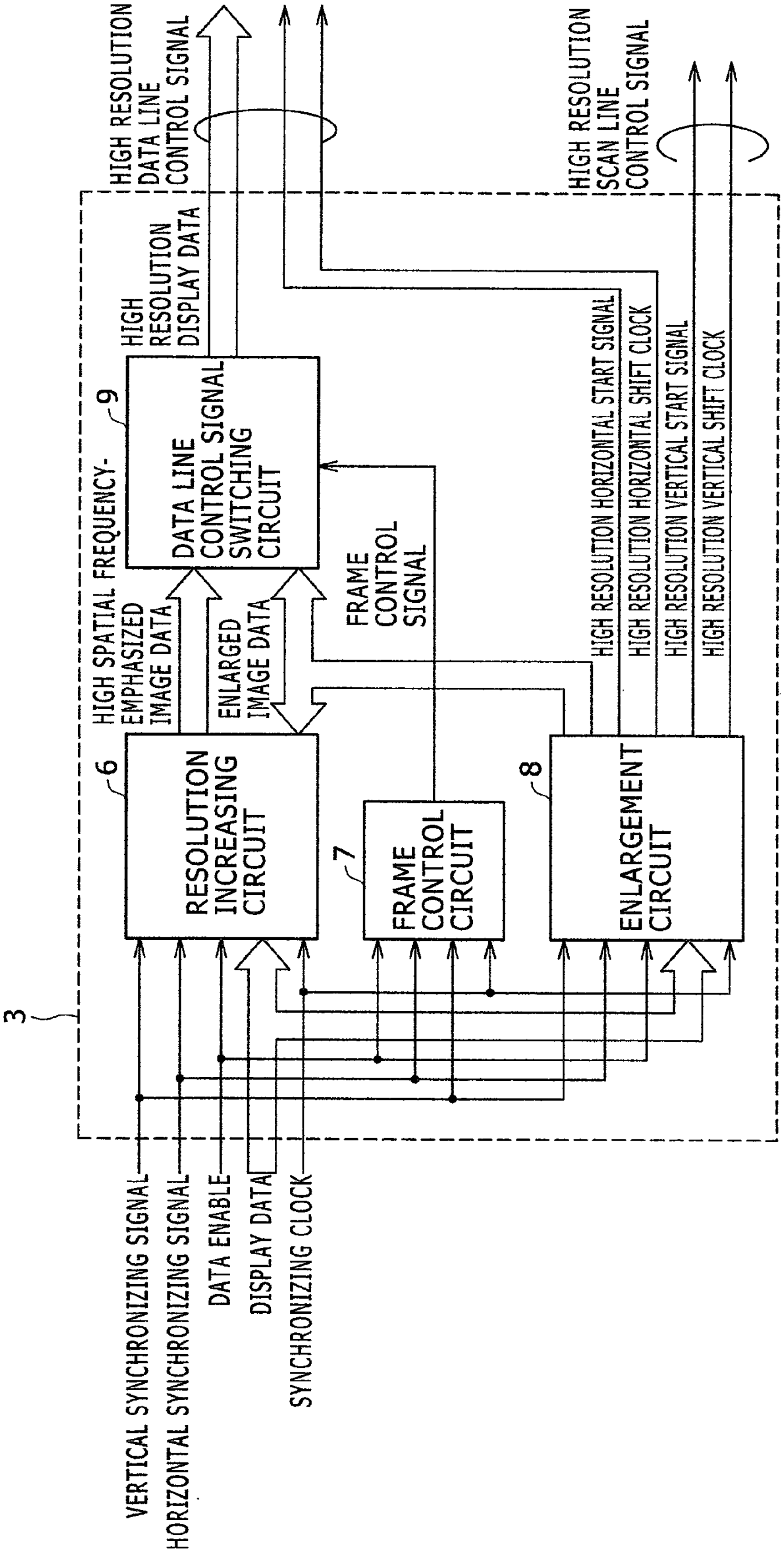
FIG. 7 is a diagram showing a configuration of a high-resolution display control circuit.

FIG. 7 is a diagram showing a configuration of the high-resolution display control circuit 3 according to this embodiment. In FIG. 7, the high-resolution display control circuit 3 includes a resolution increasing circuit 6 for increasing the resolution of display data by subjecting the display data to a super-resolution process and for emphasizing high-frequency components of the resolution-increased image, a frame control circuit 7 for creating a frame control signal for switching between high spatial frequency-emphasized image data and enlarged image data, an enlargement circuit 8 for creating enlarged image data from display data, and a data line control signal switching circuit 9 for outputting high spatial frequency-emphasized image data and enlarged image data alternately as high-resolution display data according to a frame control signal.

The high-resolution display control circuit 3 receives a vertical synchronizing signal, a horizontal synchronizing signal, data enable, a synchronizing clock, and display data and inputs the vertical synchronizing signal, horizontal synchronizing signal, data enable, synchronizing clock, and display data to the resolution increasing circuit 6 and enlargement circuit 8, as well as outputs the vertical synchronizing signal, horizontal synchronizing signal, data enable, and synchronizing clock to the frame control circuit 7.

The enlargement circuit 8 creates interpolation pixel data from display data of an adjacent pixel with respect to each of pixels of the display data, and creates enlarged pixel data by interpolating the created interpolation pixel in the corresponding original pixel and outputs the enlarged pixel data. In this case, the enlargement circuit 8 may create the interpolation pixel data from data indicating a pixel adjacent to the original pixel in the horizontal or vertical direction in an identical frame (simple enlargement method) or from the average value of data indicating such an adjacent data, or may create the interpolation pixel data using a linear function or a spline function with respect to data indicating an adjacent pixel (halftone interpolation method).

Also, if the high spatial frequency-emphasized image data and enlarged image data are displayed alternately every half frame, the enlargement circuit 8 creates a high-resolution horizontal start signal by doubling the cycle of the horizontal synchronizing signal, creates a high-resolution horizontal shift clock by doubling the cycle of the synchronizing clock, creates a high-resolution vertical start signal by doubling the cycle of the vertical synchronizing signal, creates a high-resolution vertical shift clock by doubling the cycle of the horizontal synchronizing signal, and outputs the created signals.

The resolution increasing circuit 6 creates a resolution-increased image by subjecting the display data to a super-resolution process. In the super-resolution process, multiple frames (two or three or more frames) are combined to create a new frame. In order to obtain multiple frames, it is preferable to use a frame memory allowed to store pixel data for one frame. For example, the super-resolution process includes three processes: (1) position estimation; (2) wide range interpolation; and (3) weighted sum. The (1) position estimation is a process for estimating differences between sampling phases (sampling positions) of pieces of pixel data in input multiple frames. The (2) wide range interpolation is a process for performing interpolation using a wide-range low-pass filter that transmits all high-frequency components of the original signal, including aliasing components of each pixel data, so as to increase the number of pixels (sampling points) to increase the density of pixel data. The (3) weighted sum is a process for obtaining a weighted sum using a weighted factor corresponding to the sampling phase of each density-increased data so as to cancel and eliminate aliasing components that occur when a pixel is sampled and simultaneously restoring high-frequency components of the original signal. For example, it is assumed that a frame #1, a frame #2, and a frame #3 on the time axis are input and these frames are synthesized to obtain an output frame. Also, for simplicity, it is assumed that, first, a subject moves in the horizontal direction and then the subject is subjected to a one-dimensional signal process on the horizon so that the resolution is increased. In this case, the signal waveform is displaced according to the amount of movement of the subject in the frame #2 and frame #1. Then, by performing the above-described position estimation process, the amount of the displacement is obtained. Then, the frame #2 is subjected to motion compensation so as to eliminate the displacement and a phase difference θ between sampling phases of pixels in the frames is obtained. By performing the above-described wide range interpolation process and (3) weighted sum process according to the phase difference θ, a new pixel is created in the exactly intermediate (phase difference $\theta=\pi$) position of the original pixel. Thus, the resolution is increased. Note that when increasing the resolution, all the three processes, that is, (1) position estimation, (2) wide range interpolation, and (3) weighted sum are not always required.

Subsequently, the resolution increasing circuit 6 creates high spatial frequency-emphasized image data by emphasizing high-frequency components of the resolution-increased image, and outputs the created data. In this case, the resolution increasing circuit 6 subtracts the enlarged image created in the enlargement circuit 8 from the resolution-increased image obtained by performing the super-resolution process so as to extract (high-frequency image) high-frequency components of the resolution-increased image, as shown FIG. 4C, and adds (synthesizes) the high-frequency components to the resolution-increased image obtained by performing the super-resolution process as shown in FIG. 4E.

The frame control circuit 7 creates a frame control signal from a vertical synchronizing signal, a horizontal synchronizing signal, data enable, and a synchronizing clock. If the high spatial frequency-emphasized image data and enlarged image data is displayed alternately every half frame, the frame control circuit 7 creates a frame control signal using the first half of one period of the vertical synchronizing signal as high (or low) and the second half thereof as low (or high).

The data line control signal switching circuit 9 receives the high spatial frequency-emphasized image data and enlarged image data and outputs these pieces of image data alternately according to the frame control signal. Specifically, when the frame control signal is high (low), the data line control signal switching circuit 9 outputs the high spatial frequency-emphasized image data as high-resolution display data. When the frame control signal is low (high), the data line control signal switching circuit 9 outputs the enlarged image data as high-resolution display data. That is, the data line control signal switching circuit 9 outputs the high spatial frequency-emphasized image data and enlarged image data alternately every half frame. In this case, the data line control signal switching circuit 9 may first output either of the high spatial frequency-emphasized image data and enlarged image data in one frame.

Then, the high-resolution display control circuit 3 outputs the high-resolution display data, high-resolution horizontal start signal, and high-resolution horizontal shift clock as a high-resolution data line control signal and outputs the high-resolution vertical start signal and high-resolution vertical shift clock as a high-resolution scan line control signal.

Second Embodiment

A second embodiment of the present invention is characterized in that the display proportion of the enlarged image is made smaller than that in the first embodiment and the display proportion of the resolution-increased image is made larger than that in the first embodiment. Thus, motion blur is reduced to a greater extent than in the first embodiment.

Figure 8:
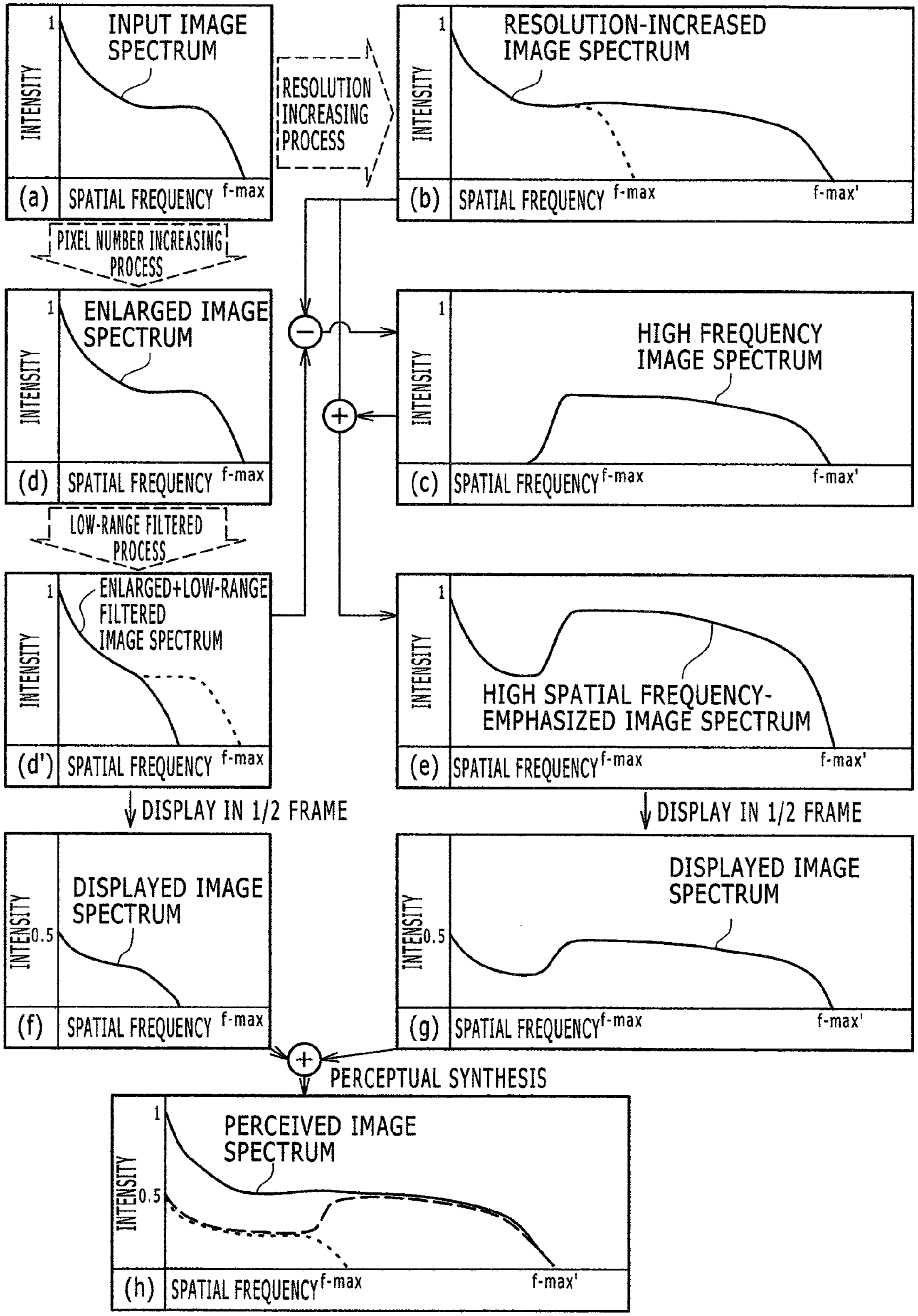
FIG. 8A to 8H are graphs showing the concept of a resolution increasing process according to a second embodiment of the present invention.

FIGS. 8A to 8H are graphs showing the concept of a resolution increasing process according to the second embodiment. Like FIGS. 4A to 4H, FIGS. 8A to 8H show images as graphs whose vertical axis represents the intensity of an image spectrum and whose horizontal axis represents the spatial frequency of an image. FIGS. 8A to 8H are different from FIGS. 4A to 4H in that, as shown in FIG. 8D', an enlarged image D is subjected to a low-frequency pass filter process so that the frequency range of the enlarged image D is reduced toward the low frequency side (e.g., f-max/2). The low-frequency pass filter process refers to a process for eliminating high-frequency components and transmitting low frequency components. The low-frequency pass filter process is performed in the resolution increasing circuit 6. Thus, an enlarged+low-range filtered image D' is obtained.

Then, as shown in FIG. 8C, a difference between the enlarged+low-range filtered image D' and a resolution-increased image B is defined as a high-frequency image C. Then, by emphasizing the high spatial frequency of the resolution-increased image B using the high-frequency image C, a high spatial frequency-emphasized image E is obtained. Then, by displaying the high spatial frequency-emphasized image E and enlarged+low-range filtered image D' alternately every half frame using the pseudo-impulse display method, a perceived image H is obtained.

FIGS. 9A to 9D are graphs showing a mechanism for reducing motion blur according to the second embodiment. Like FIG. 5C, FIG. 9C displays the enlarged+low-range filtered image d' shown in FIG. 8D' and high spatial frequency component-emphasized image E of the resolution-increased image shown in FIG. 8E alternately every half frame using the pseudo-impulse method. FIGS. 9A to 9D correspond to FIGS. 5A to 5D, respectively.

Figure 9A:
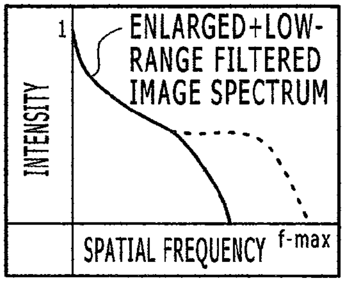
FIGS. 9A to 9D are graphs showing a mechanism for reducing motion blur according to the second embodiment.
Figure 9B:
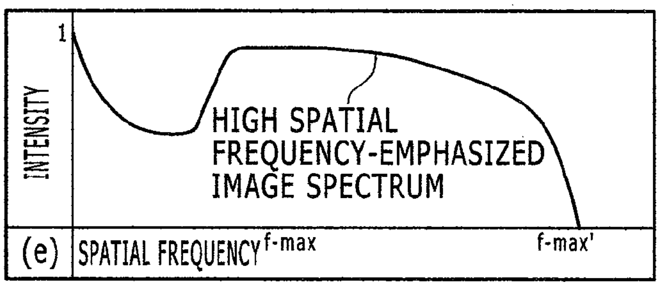
Figure 9C:
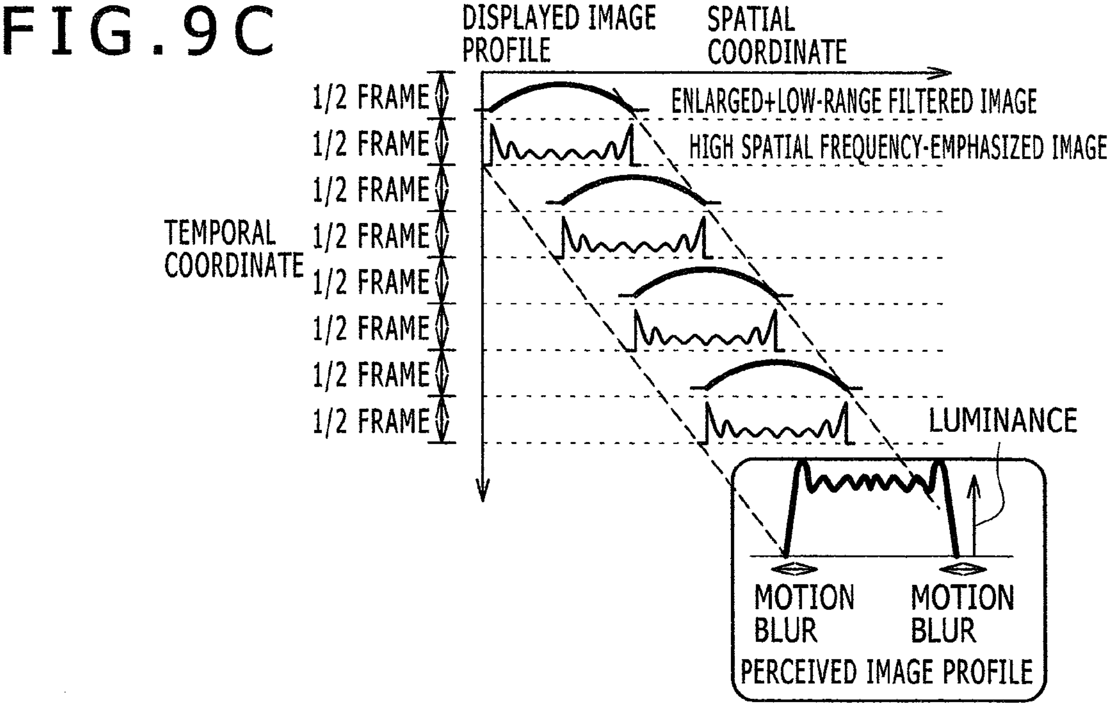
Figure 9D:
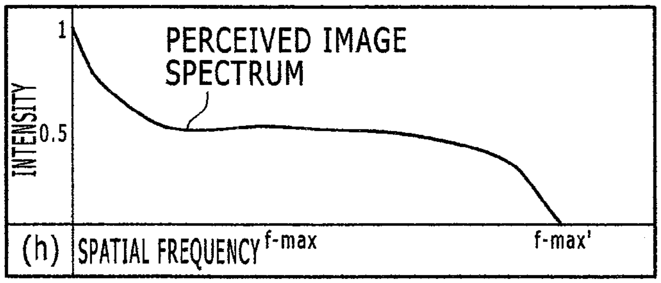

From FIG. 9C, it is understood that the displayed image profile of the high spatial frequency component-emphasized image shows minute change structures not found in the displayed image profile of the input image due to having undergone a resolution increasing process. Also, high-frequency components of the displayed image profile of the enlarged+low-range filtered image D' are small in number, that is, are substantially eliminated. According to this method, the widths of the changing parts of the perceived image profile at both ends thereof become smaller than those in the first embodiment. Also, in the past displayed image profiles, the effect of integration of the high spatial frequency components of the past display image profiles that are responsible for motion blur are further reduced. As a result, motion blur is reduced. Further, like in the first embodiment, light is emitted in a period equal to a period when hold-type display is performed. As a result, no luminance reduction occurs.

As is understood from the above-description, the embodiments of the present invention are applicable to liquid crystal televisions and liquid crystal monitors.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. An image display device comprising:

a first enlargement circuit that creates a first enlarged image from an original image by performing an enlargement process including a process for increasing resolution by enlarging a spatial frequency component and emphasizes a high spatial frequency component of the first enlarged image;

a second enlargement circuit that creates a second enlarged image from the original image by performing an enlargement process not including a process for increasing resolution by enlarging a spatial frequency component;

a switching circuit that alternately outputs an emphasized enlarged image from the first enlargement circuit and the second enlarged image from the second enlargement circuit; and a display module that displays an image output from the switching circuit.

2. An image processing circuit comprising:

a first enlargement circuit that creates a first enlarged image from an original image by performing an enlargement process including a process for increasing resolution by enlarging a spatial frequency component and emphasizes a high spatial frequency component of the first enlarged image;

a second enlargement circuit that creates a second enlarged image from the original image by performing an enlargement process not including a process for increasing resolution by enlarging a spatial frequency component; and a switching circuit that alternately outputs an emphasized enlarged image from the first enlargement circuit and the second enlarged image from the second enlargement circuit.

3. An image processing method comprising:

creating a first enlarged image from an original image by performing an enlargement process including a process for increasing resolution by enlarging a spatial frequency component and emphasizing a high spatial frequency component of the first enlarged image;

creating a second enlarged image from the original image by performing an enlargement process not including a process for increasing resolution by enlarging a spatial frequency component; and outputting the emphasized first enlarged image and the second enlarged image alternately.

4. An image display device configured with circuitry for displaying an original image in such a manner that resolution of the original image is increased, wherein an emphasized enlarged image and a second enlarged image are displayed alternately, wherein the emphasized enlarged image emphasizes a high spatial frequency component of a first enlarged image enlarged so as to have a spatial frequency range wider than a spatial frequency range of the original image, and wherein the second enlarged image is enlarged so as to have a spatial frequency range equal to the spatial frequency range of the original image.

5. The image display device according to claim 4, wherein the spatial frequency range of the first enlarged image is wider than the spatial frequency range of the original image under a magnification corresponding to an enlargement ratio of an image, wherein a spatial frequency spectrum of the first enlarged image is enlarged so that a spatial frequency spectrum of the original image slides from the spatial frequency range of the original image to a spatial frequency range after enlargement, wherein a spatial frequency spectrum of a high spatial frequency component of the emphasized enlarged image is stronger than a spatial frequency spectrum of a high spatial frequency component of the first enlarged image under a magnification corresponding to a ratio of a display time of the first enlarged image to one frame, and wherein a spatial frequency spectrum of the second enlarged image is equivalent to the spatial frequency spectrum of the original image.

6. An image processing circuit configured for increasing resolution of an original image, wherein an emphasized enlarged image and a second enlarged image are output alternately, wherein the emphasized enlarged image emphasizes a high spatial frequency component of a first enlarged image enlarged so as to have a spatial frequency range wider than a spatial frequency range of the original image, and wherein the second enlarged image is enlarged so as to have a spatial frequency range equal to the spatial frequency range of the original image.

7. An image display method for increasing resolution of an original image, the image display method comprising:

creating a first enlarged image enlarged so as to have a spatial frequency range wider than a spatial frequency range of the original image;

emphasizing a high spatial frequency component of the first enlarged image; creating a second enlarged image enlarged so as to have a spatial frequency range equal to the spatial frequency range of the original image; and outputting the emphasized first enlarged image and second enlarged image alternately.

* * * * *